April 30, 1957 W. C. ASHBY 2,790,535
ARRANGING AND COMBINING MACHINE
Filed April 13, 1956 5 Sheets-Sheet 1

INVENTOR.
WILLIAM C. ASHBY
BY

April 30, 1957 W. C. ASHBY 2,790,535
ARRANGING AND COMBINING MACHINE
Filed April 13, 1956 5 Sheets-Sheet 3

INVENTOR
WILLIAM C. ASHBY

INVENTOR.
WILLIAM C. ASHBY

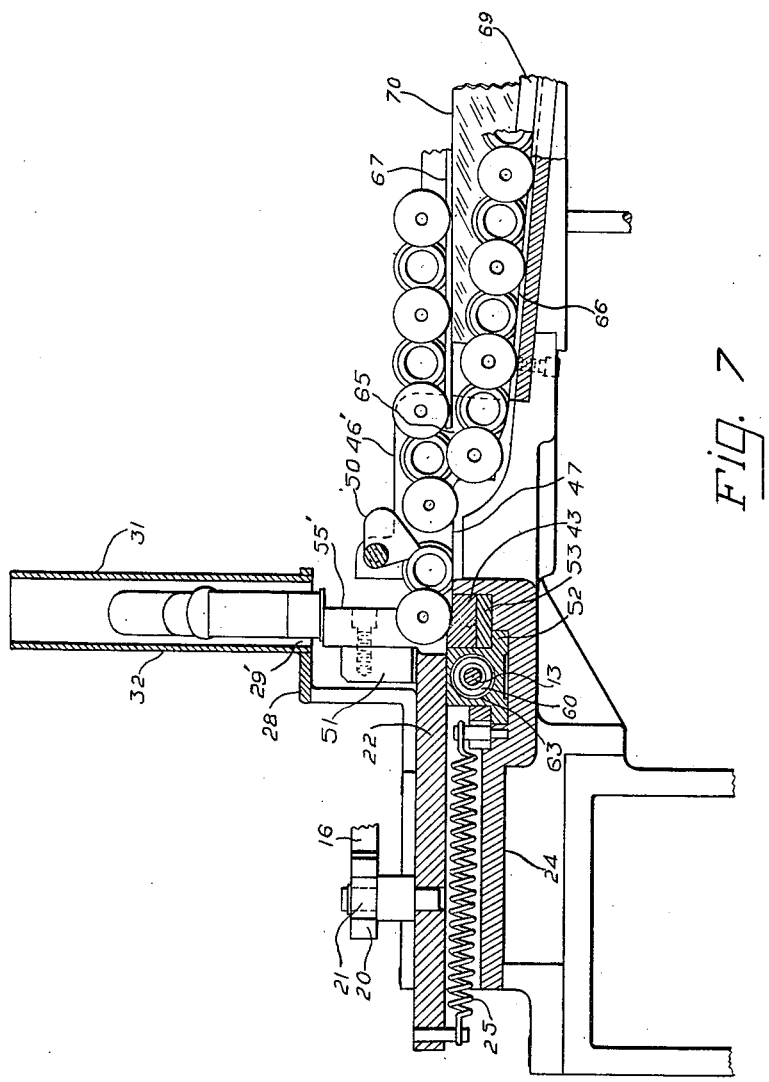

United States Patent Office 2,790,535
Patented Apr. 30, 1957

2,790,535

ARRANGING AND COMBINING MACHINE

William C. Ashby, Fairfield, Conn., assignor to Remington Arms Company, Inc., Bridgeport, Conn., a corporation of Delaware Application April 13, 1956, Serial No. 577,985

6 Claims. (Cl. 198—33)

This invention relates to a machine for arranging and combining elongated articles received from two sources into a single symmetrical row having successive articles in longitudinal reversed positions, in preparation for packing in containers. The machine will be described with reference to arranging and combining of shot shells, but it will be understood that its utility is not limited to this field.

Known shot shell loading machines of the duplex type shown in the patent to Reynolds et al., U. S. No. 2,663,421, dated December 22, 1953, eject loaded and finished shells at two delivery ports on the machine. From each delivery port, vertically arranged shells, with their flanged bases in advance, are carried through substantially vertical delivery tubes by gravity to a separate packing station. At each packing station, a machine receives the shells from a single delivery tube, arranges them in a row with the mouth of each shell adjacent the bases of flanking shells in the row, and delivers the arranged shells to an inspection table, from which they may be removed into containers. Thus, in known procedure, the product of one loading machine is divided for arrangement, inspection, and packaging at two packing stations. This is not advantageous, since duplication of machinery and inspection labor is necessary, and the total loading machine product is not subjected to inspection by one person.

An object of my invention is to arrange and combine the divided product of a shot shell loading machine at a single packing station prepared for visual inspection, thus facilitating inspection and lot segregation.

A further object of my invention is to provide an arranging and combining machine which is capable of handling the complete output of a duplex loading machine.

A still further object of my invention is to provide an arranging and combining machine which is positive in operation yet incapable of applying a crushing force to the objects which are arranged and combined.

To attain these objectives, my apparatus provides means to receive shells from two sources and deliver these shells lengthwise to two spaced stations, a reciprocating gating means to pass shells alternately from each station to a common track, arranging surfaces on the gating means which are operative in reciprocation to turn successive shells over tripping surfaces on the track, in opposite directions, to a recumbent position, and then move the shells along the track to an exit port, and ejection means to move successive shells through said port onto an inspection table. A row of shells is thus formed on the inspection table, in which row successive shells are longitudinally reversed.

Other objects of my invention will appear from the following description taken in connection with the drawings of a preferred embodiment of mechanism for arranging and combining shot shells.

In the drawings:

Fig. 7 is a partial sectional view showing the ejection mechanism and the inspection table.

Figure 1:
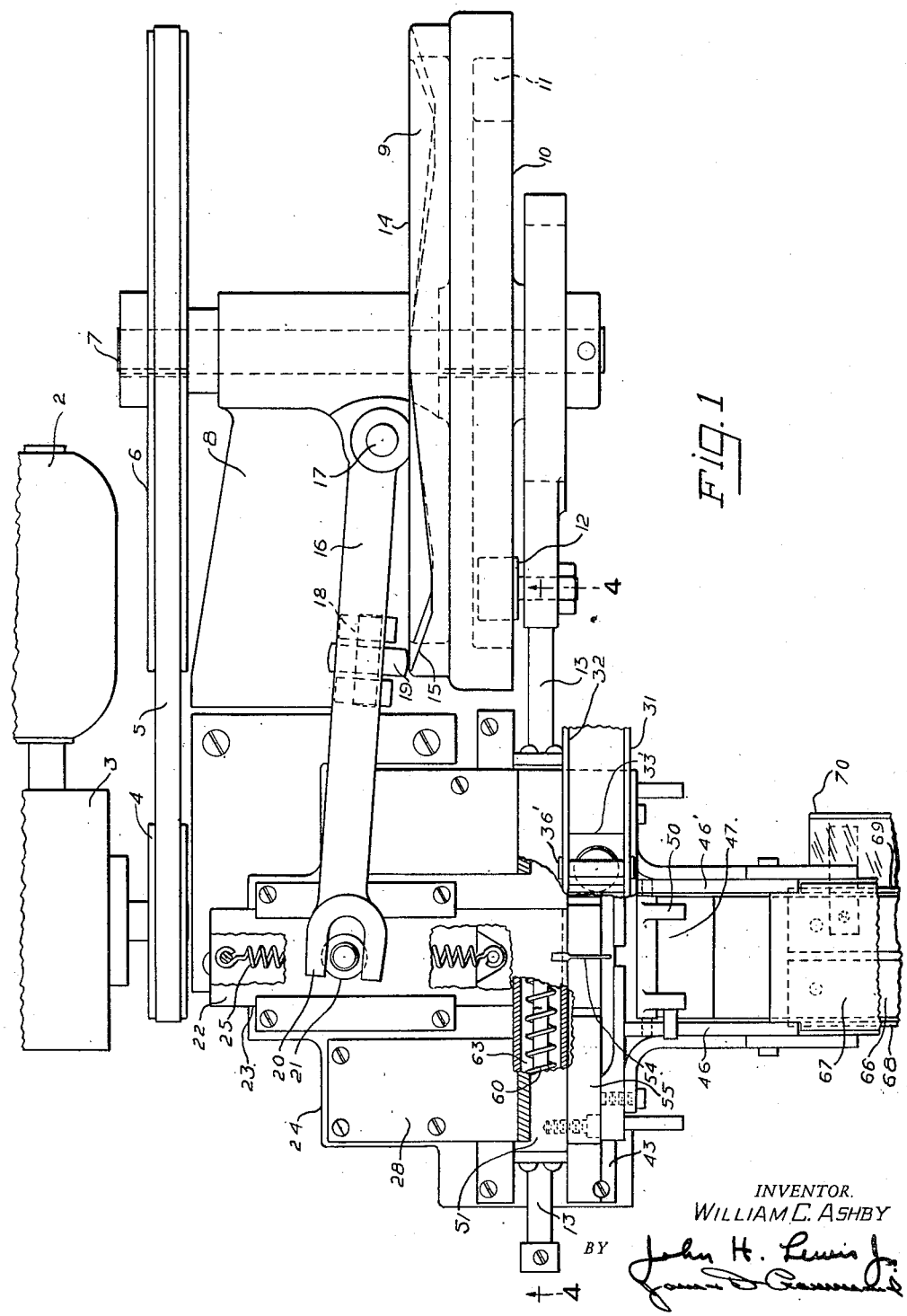
Fig. 1 is a plan view of the machine with portions of the shell delivery means and the arranging means broken away.
Figure 2:
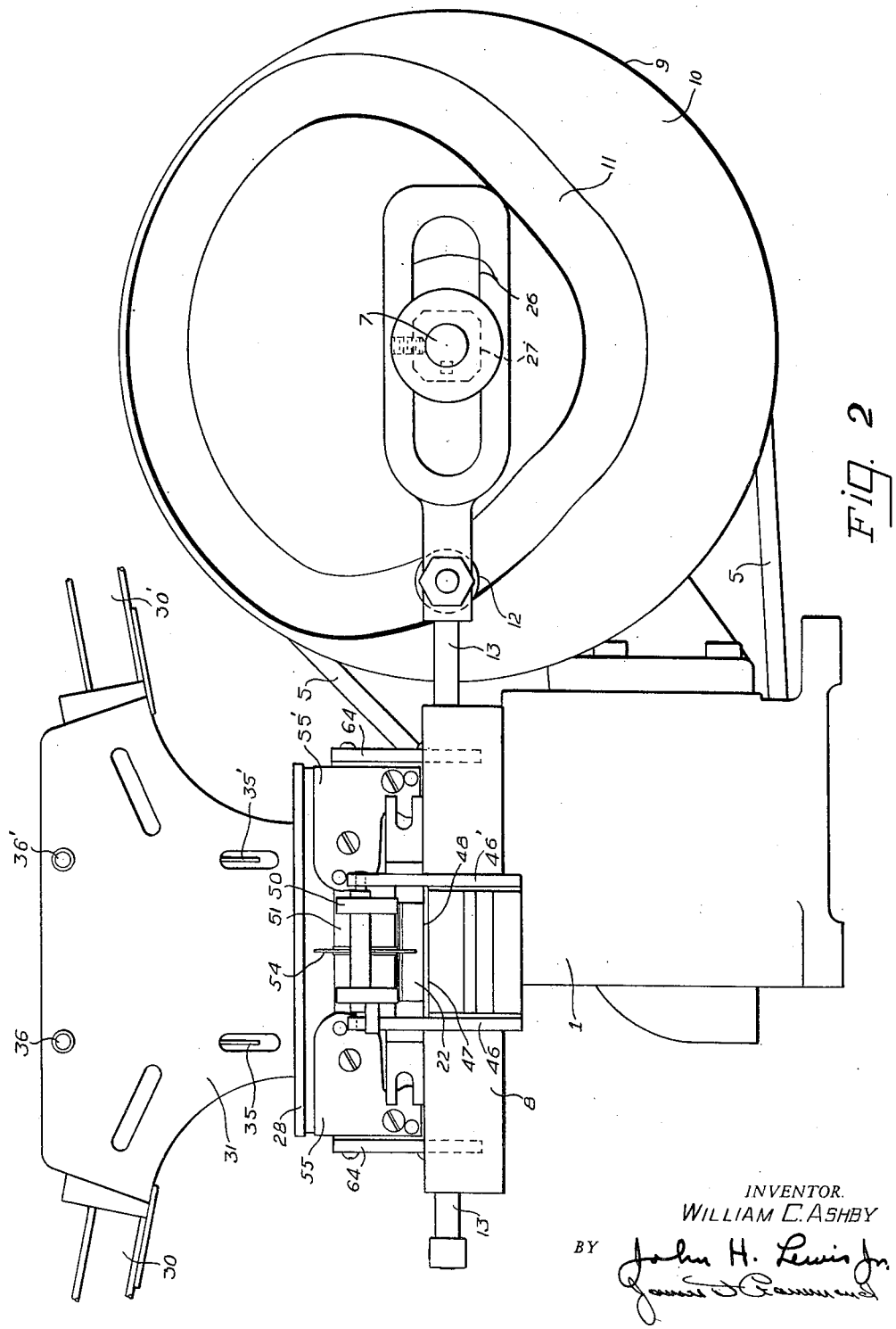
Fig. 2 is a front elevational view of the machine.

The machine drive which operates the shell arranging mechanism and the shell ejecting mechanism in synchronism will first be described. As shown in Figs. 1 and 2, the machine is preferably mounted on a stand 1. An electric motor 2 provided with a gear reduction unit 3 provides power for machine operation. A pulley 4 mounted on the output shaft of the gear reduction unit transmits power through belt 5 to the pulley 6 which is fixed to the mainshaft 7. The mainshaft is rotatably supported in the machine frame 8 and has fixed thereto drive wheel 9. Both the reciprocatory shell arranging mechanism and the shell ejection mechanism are driven in synchronism by related cam surfaces formed on opposite faces of the drive wheel. As best shown in Fig. 2, face 10 of the drive wheel is provided with an internal cam track 11. A cam follower 12 is disposed in the internal cam track, and is mounted on a drive rod 13. Yoked bearing surfaces 26 and bearing block 27 support the drive rod for reciprocation as the cam follower rolls in the internal cam track. The reciprocatory shell arranging means is driven by the drive rod in a manner hereinafter described.

Referring to Fig. 1, it will be seen that face 14 of drive wheel 9 has a cylindrical cam 15 formed thereon. This cylindrical cam controls the movement of a reciprocatory shell ejector 22 which operates transversely of the arranging mechanism.

As best shown in Figs. 1 and 7, the shell ejector is mounted in guideway 23 of the support 24. A tension spring 25 affixed to the shell ejector and the support 24 resiliently biases the ejector toward the right to ejection position. A bearing block 21 on the ejector is carried within the bearing fork 20 (Fig. 1) formed on arm 16. A bearing post 17 supports the arm for horizontal pivotal movement. Trunnions 18 on the arm support a shafted roller 19 which engages cylindrical cam 15. As drive wheel 9 rotates, ejector 22 is alternately retracted to the non-ejecting position shown by the cylindrical cam, and then is moved to ejection position by the spring 25, under control of the cam surfaces.

Figure 3:
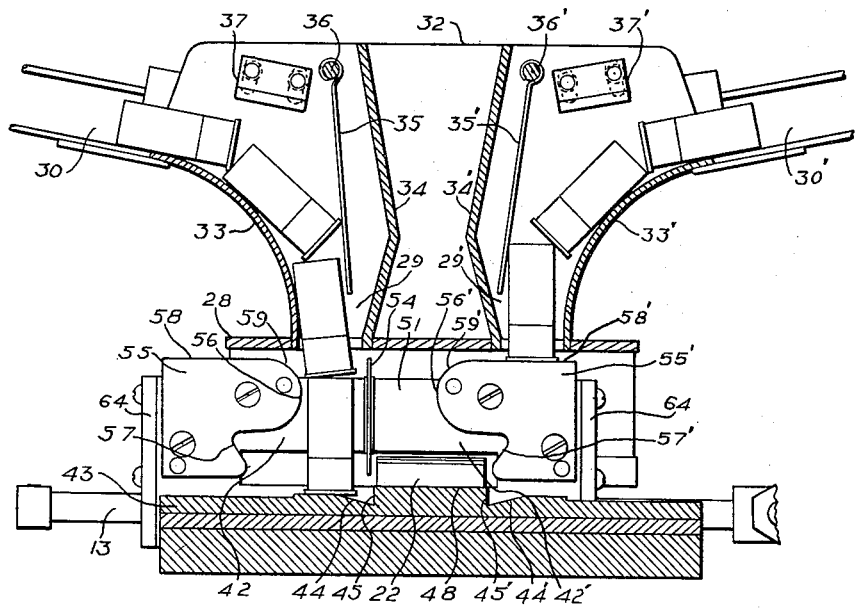
Fig. 3 is an elevational view, partly in section, of the arranging mechanism at the left hand extent of reciprocation.
Figure 5:
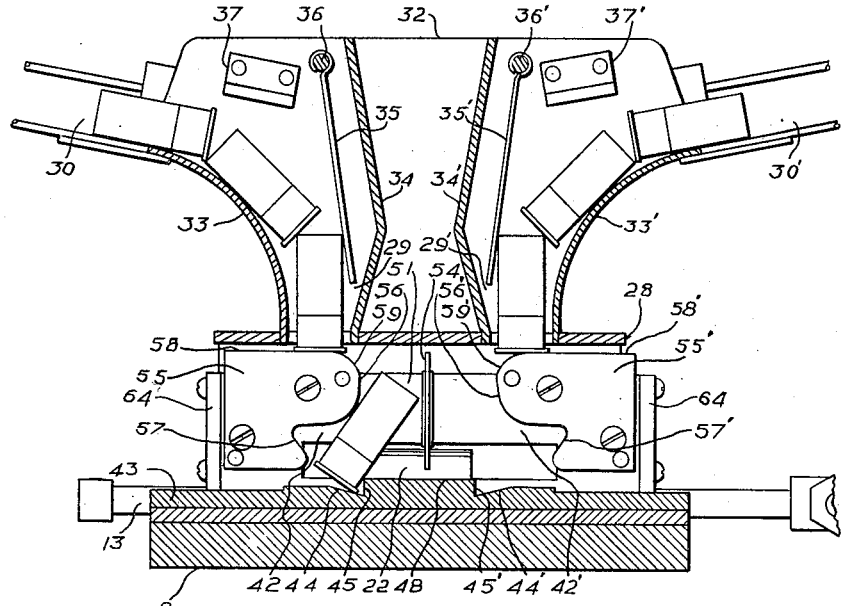
Fig. 5 is a view similar to Fig. 3, but showing the arranging mechanism at an intermediate point in reciprocation to the right.
Figure 6:
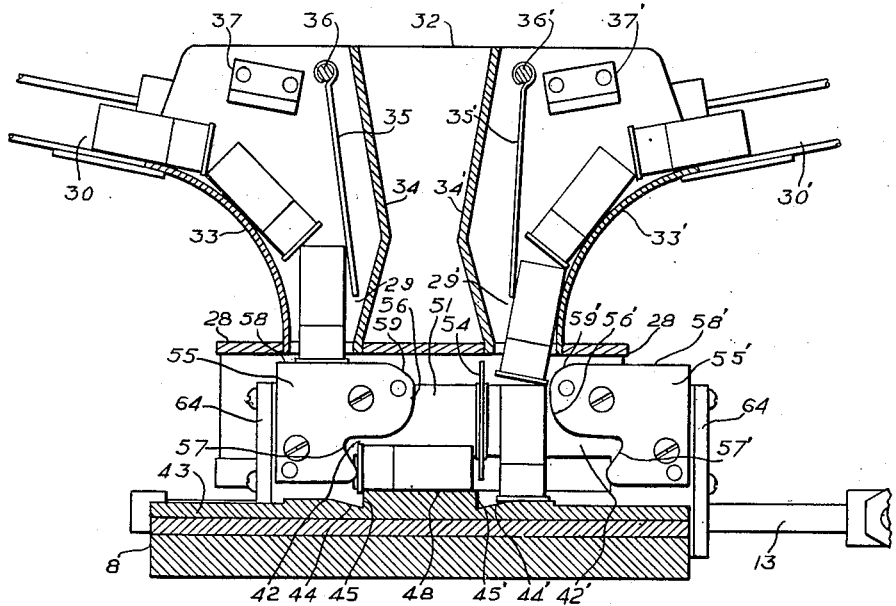
Fig. 6 is a view similar to Fig. 3 but showing the arranging mechanism at the right hand extent of reciprocation.

The shell arranging mechanism is best shown in Figs. 3, 5 and 6. A shell track 43 (Fig. 3) is mounted on the machine frame below the paired shell delivery chutes 29 and 29' at sufficient distance to accept a vertically arranged shell between the track 43 and the base of chutes 29 and 29'. The center of the track lies between chutes 29 and 29' and is raised to form a track platform 48 of suitable dimension to accept a shell lying on its side.

On either side of the platform, an angular notch is cut in the track to define tripping surfaces 45 and 45' and ramps 44 and 44'. The tripping surfaces are disposed to engage the base of a vertically arranged shell during the turning operation which will be described hereinafter. The ramps extend from the base of the tripping surfaces to a juncture with the surface of track 43 under the shell chutes 29 and 29'. A relief is thus provided which permits a vertically arranged shell to be first tipped about the center of the shell base rather than an edge of the base, thereby obviating any tendency of the shell to move laterally of the track during the turning operation.

A reciprocable bar 51 is mounted by means of rails 52 in base block 53 (see Fig. 7), for rectilinear motion adjacent track 43 by drive rod 13. Referring again to Fig. 3, a central partition plate 54 on bar 51 is disposed over track 43. The arranging blocks 55 and 55' are mounted on bar 51 by means of screws and substantially fill the space between track 43 and the shell delivery chutes 29 and 29'. The blocks are characterized by arcuate noses 56 and 56', which extend toward the partition 54. The disposition of the blocks 55 and 55' is such that shell passages 42 and 42' are obtained on either side of partition 54. Arcuate noses 56 and 56' regress downwardly and terminate in the angular abutments 57 and 57'. Blocks 55 and 55' thus define on either side of partition 54 chambers of sufficient dimension to accept a shell vertically and permit it to be turned to a horizontal position between either of the abutments 57 or 57' and the partition 54. The top planar surfaces 58 and 58' of blocks 55 and 55' are disposed immediately below the shell chutes 29 and 29'. At the projecting ends of the blocks, surfaces 58 and 58' join the respective arcuate noses 56 and 56' in curved surfaces 59 and 59'. Surfaces 58 and 58' support the line of shells in chutes 29 and 29' respectively and prevent them from entering the arranging mechanism until bar 51 reaches its extent of reciprocation to the right or left, at which positions one of the shell passages 42 or 42' will register with a respective chute 29 or 29', depending on the direction of movement of bar 51.

Figure 4:
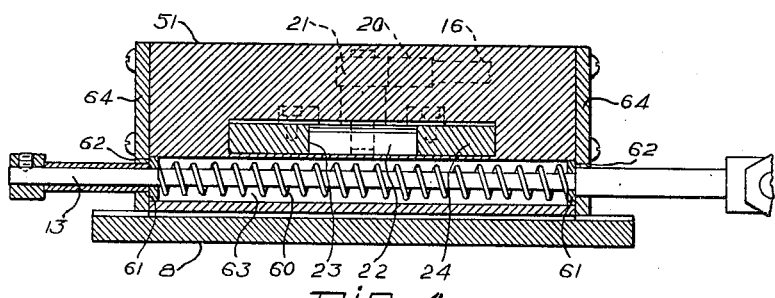
Fig. 4 is a vertical section on line 4—4 of Fig. 1, showing the overload device for the arranging mechanism.

Bar 51 is driven in reciprocation by drive rod 13 through a resilient overload connection which will permit bar 51 to stop while drive rod 13 continues its reciprocations in the event a shell becomes jammed in the arranging mechanism. This is of importance to obviate the possibility of an explosion which might result from a jammed shell subjected to crushing pressure. The features of the overload mechanism are best shown in Fig. 4. Drive rod 13 passes through a bore 63 of bar 51. Bore 63 is of sufficient diameter to receive the elements of the overload mechanism. At the ends of the bore, caps 64 are fastened to the bar by any suitable means. The drive rod passes through aligned openings in the caps and is journaled thereby. Bearing plates 61 are slidably mounted on a reduced diameter section of drive rod 13 in the bore, and are pressed into engagement with the caps 64 by means of compression spring 60. The shoulders 62 formed at the juncture of the two diameters of drive rod 13 abut against the bearing plates 61 and serve to normally transmit driving force through the bearing plate and the spring 60 to the caps fixed to bar 51. Thus, the bar will normally reciprocate with drive rod 13, but if for any reason the bar meets undue resistance to movement, it will stop and drive rod 13 will continue to move, compressing spring 60 by moving one of the bearing plates 61 longitudinally in the recess.

The means provided to deliver shells to the arranging mechanism from two sources is shown in Fig. 3. The paired shell delivery chutes 29 and 29' are supported by angle bracket 28 above the arranging mechanism, to communicate with delivery tubes 30 and 30' from the loading machine, and are defined by the front wall 31, the rear wall 32, the side walls 33 and 33', and the interior partitions 34 and 34'. Depending metal plates 35 and 35' subtend the shell passages and are freely pivoted on studs 36 and 36'. Adjustably mounted angle plates 37 and 37' further define the shell chutes and permit an adjustment of passage area. The curvature of the chutes 29 and 29' in conjunction with the depending plates 35 and 38' provide a means to decelerate the incoming shells and orient them in the proper stations for engagement by the arranging mechanism previously described.

The operation of the mechanism is best shown sequentially in Figs. 3, 5 and 6. In Fig. 3, bar 51 is disposed at the left hand extent of reciprocation, and shell passage 42 is in alignment with chute 29. A shell has dropped from chute 29 and rests vertically on track 43. In delivery chute 29' the lead shell is supported by surface 58' of block 55'. In Fig. 5, bar 51 is in movement to the right, nose 56 of block 55 has engaged the shell on the track above longitudinal center, and the shell is turning in the direction of movement of bar 51 about the pivot formed by the engagement of the shell base with the ramp 44. Curved surface 59 of block 55 engaged under the base flange of the shell next in line in chute 29 early in the rightward movement of block 55, and the continued movement of the block, has brought surface 58 under the base of this shell. In Fig. 6, the shell on track 43 has been turned to a horizontal position on track platform 48, and in this position has been moved by abutment 57 until only the base flange of the shell overhangs the tripping surface. The shell is now in position for ejection from the track. The bar 51 is now at its right hand extent of reciprocation, shell passage 42' is in registration with chute 29', and a shell has dropped from chute 29' onto track 43.

The curvature of cam track 11 is such that bar 51 dwells at each extent of reciprocation for sufficient time to allow the shell reposing on the track platform to be moved therefrom by the shell ejector 22. As shown in Fig. 7, the shell ejector 22 is in retracted position. During an ejection cycle, the shell ejector is impositively driven to the right by the spring 25, thus pushing the shell on the track platform 48 off of the track towards weighted gate 50. The shell shown detented by gate 50 is forced past the gate by the ejected shell, which takes its place against the gate. Since the shell ejector is impositively driven, any undue obstruction to movement of a shell from the track platform will override the driving spring until the shell ejector is retracted. Thus, a jammed shell is not subjected to a distorting force which might cause an explosion. The weighted gate 50 is offset from the track and is pivotally mounted in guide plates 46 and 46' (Fig. 1). The gate functions to prevent shells from entering the short delivery guide 47 prematurely or in improper alignment.

After the ejection cycle is completed and the shell ejector is retracted again to the position shown in Fig. 7, bar 51 is moved to the left by drive rod 13, and the shell on track 43 from chute 29' is turned, moved to the proper position on the track platform, and is ejected therefrom in a repetition of the arranging and ejecting cycles just described.

Successive longitudinally reversed shells ejected from the track platform engage the preceding shell restrained by gate 50, and push it through the gate onto short delivery guide 47. Normally, shells thus delivered fall through a gap 65 onto an inclined inspection table 66. If the inspection table is full, as illustrated in Fig. 7, gap 65 is bridged by the last shell on the table, and additional shells delivered through gate 50 will roll over the bridged gap onto overflow track 67.

The inspection table 66 is of a width slightly greater than a shot shell and is bounded by low front and rear guides 68 and 69. A mirror 70 is arranged along the back of the inspection table adjacent back guide 69, enabling an inspector at the front of the table to inspect fully the row of shells on the table.

In accordance with the provisions of the patent statutes, I have described the principles of operation of my invention together with the device which I consider a preferred embodiment thereof. However, it is to be understood that my invention is not limited to the particular construction or mechanism herein disclosed, as the same may be carried out by other means, and applied to other uses, within the principle of the invention and the scope of the appended claims.

I claim:

1. In combination, delivery means for feeding differentially ended elongated articles in uniform orientation to two spaced stations, an article track spanning said stations, reciprocating means for passing an article to said track at each extent of reciprocation from an alternate station, heterochiral article engaging surfaces on said reciprocating means alternately effective to turn successive articles in opposite direction to a lengthwise position on said track and then move said articles to an ejection point on said track, and ejector means at said ejection point moving articles from said track, thereby arranging articles into a row with successive articles longitudinally reversed.

2. In combination, delivery means presenting differentially ended elongated articles in uniform orientation to two spaced stations, an article track spanning said stations, spaced tripping means on said track, reciprocating means having two article passages therein disposed to pass an article to said track at each extent of reciprocation from an alternate station, two spaced projections on said reciprocating means alternately effective to turn successive articles in opposite directions to recumbent position over said tripping means, two spaced abutments on said reciprocating means alternately effective to move turned articles to a common point on the track, and ejection means moving articles from said common point on said track, thereby arranging articles into a row having successive articles longitudinally reversed.

3. In apparatus for arranging elongated articles having differential ends into a recumbent row having successive articles longitudinally reversed, the combination of delivery means for feeding articles in uniform orientation to two spaced stations, an article track spanning said stations, an article exit port on said track, tripping means on said track intermediate said stations and said port, a reciprocating element between said stations and said track blocking said stations, two article passages in said element disposed to alternately register with respective stations at opposite extents of reciprocation for passing an article to said track, a projection in each of said passages for turning articles over said tripping means toward said port to recumbent position, an abutment in each of said passages for moving turned articles to said port, and ejection means for moving articles from said port, thereby forming a row of arranged articles.

4. In apparatus for arranging elongated articles having differential ends into a recumbent row having successive articles longitudinally reversed, the combination of delivery means for feeding articles in uniform orientation to two spaced stations, an article track spanning said stations, an article exit port on said track, tripping means on said track intermediate said stations and said port, a reciprocating element between said stations and said track blocking said stations, two article passages in said element disposed to alternately register with respective stations at opposite extents of reciprocation for passing an article to said track, a projection and a contiguous recessed abutment defining a wall of each passage, said projection disposed to turn articles to recumbent position over said tripping means towards said port, said abutment disposed to push turned articles to said port, and ejection means moving successive articles laterally from said port, thereby forming an arranged row of articles.

5. The apparatus described in claim 4, said delivery means comprising spaced gravity feed chutes with mouths on a common base, said chute mouths defining said spaced stations.

6. The apparatus described in claim 4, said reciprocating element comprising a bar, a central partition on said bar, two blocks on said bar spaced from said partition to define an article passage on each side of said partition, with said projection and said contiguous recessed abutment forming a face of each block.

References Cited in the file of this patent

UNITED STATES PATENTS 1,275,581    Macomber _____ Aug. 13, 1918